(12) United States Patent
Jung et al.

(10) Patent No.: US 8,774,130 B2
(45) Date of Patent: Jul. 8, 2014

(54) ACCESS POINT, L2 SWITCH AND METHOD OF SUPPORTING MULTICAST HANDOVER USING THE ACCESS POINT AND L2 SWITCH

(75) Inventors: Il-Gu Jung, Daejeon-si (KR); Eun-Jun Rhee, Daejeon-si (KR); Kyoung-Hee Lee, Daejeon-si (KR); Sang-Kyoun Jo, Cheongju-si (KR); Sung-Kuen Lee, Anyang-si (KR); Kyeong-Seob Cho, Daejeon-si (KR); Hyun-Woo Lee, Daejeon-si (KR); Won Ryu, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 398 days.

(21) Appl. No.: 13/303,661

(22) Filed: Nov. 23, 2011

(65) Prior Publication Data

US 2012/0134313 A1  May 31, 2012

(30) Foreign Application Priority Data

Nov. 26, 2010  (KR) .................. 10-2010-0118794

(51) Int. Cl.
 *H04W 4/00* (2009.01)
 *H04W 36/18* (2009.01)
(52) U.S. Cl.
 CPC .................... *H04W 36/18* (2013.01)
 USPC ...................................... 370/331

(58) Field of Classification Search
 USPC ............... 370/252, 312, 331; 455/422.1, 436
 See application file for complete search history.

(56) References Cited

U.S. PATENT DOCUMENTS

2007/0274290 A1* 11/2007 Takahashi et al. ............ 370/351
2010/0202612 A1*  8/2010 Nema et al. ................... 380/256

FOREIGN PATENT DOCUMENTS

KR    10-2009-0060925     6/2009

OTHER PUBLICATIONS

H. Asaeda, et al. "PMIPv6 Extensions for Multicast" MULTIMOB Group, Internet Draft, Intended status: Standards Track, Expires: Sep. 9, 2010, 34pages.

* cited by examiner

*Primary Examiner* — Phuongchau B Nguyen
(74) *Attorney, Agent, or Firm* — Staas & Halsey LLP

(57) ABSTRACT

An access point, a layer 2 switch, and multicast handover supporting method using the access point and the layer 2 switch are provided. According to the method of supporting multicast handover, when a mobile node is handed over from one cell to another while being provided with a multicast service in a wireless mobile communication network, the L2 switch performs multicast traffic routing in response to reception of MAC address information and multicast service source and group information from the access point. Hence, multicast traffic can be supported to be fast and seamlessly handed over within layer 2 network equipment.

17 Claims, 19 Drawing Sheets

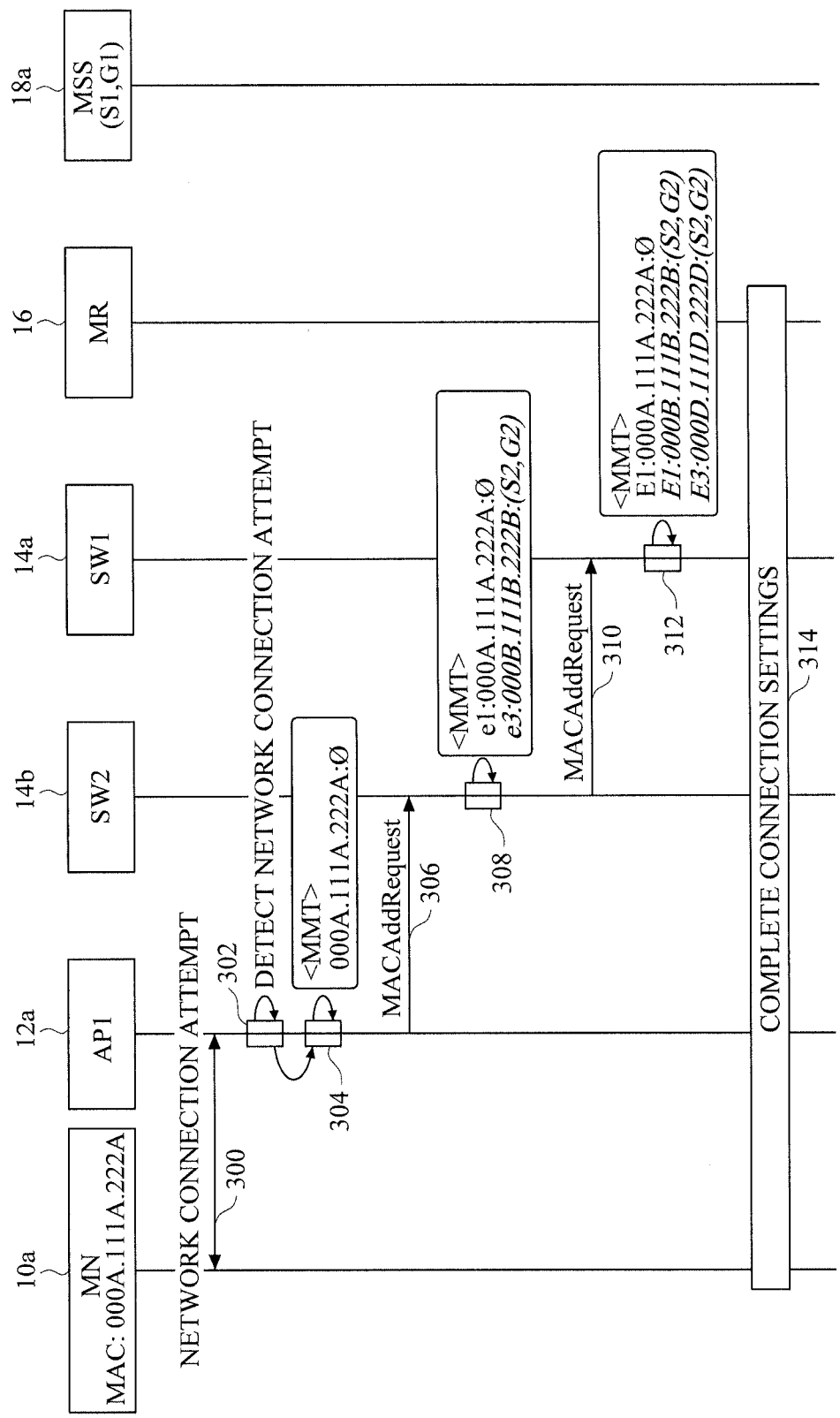

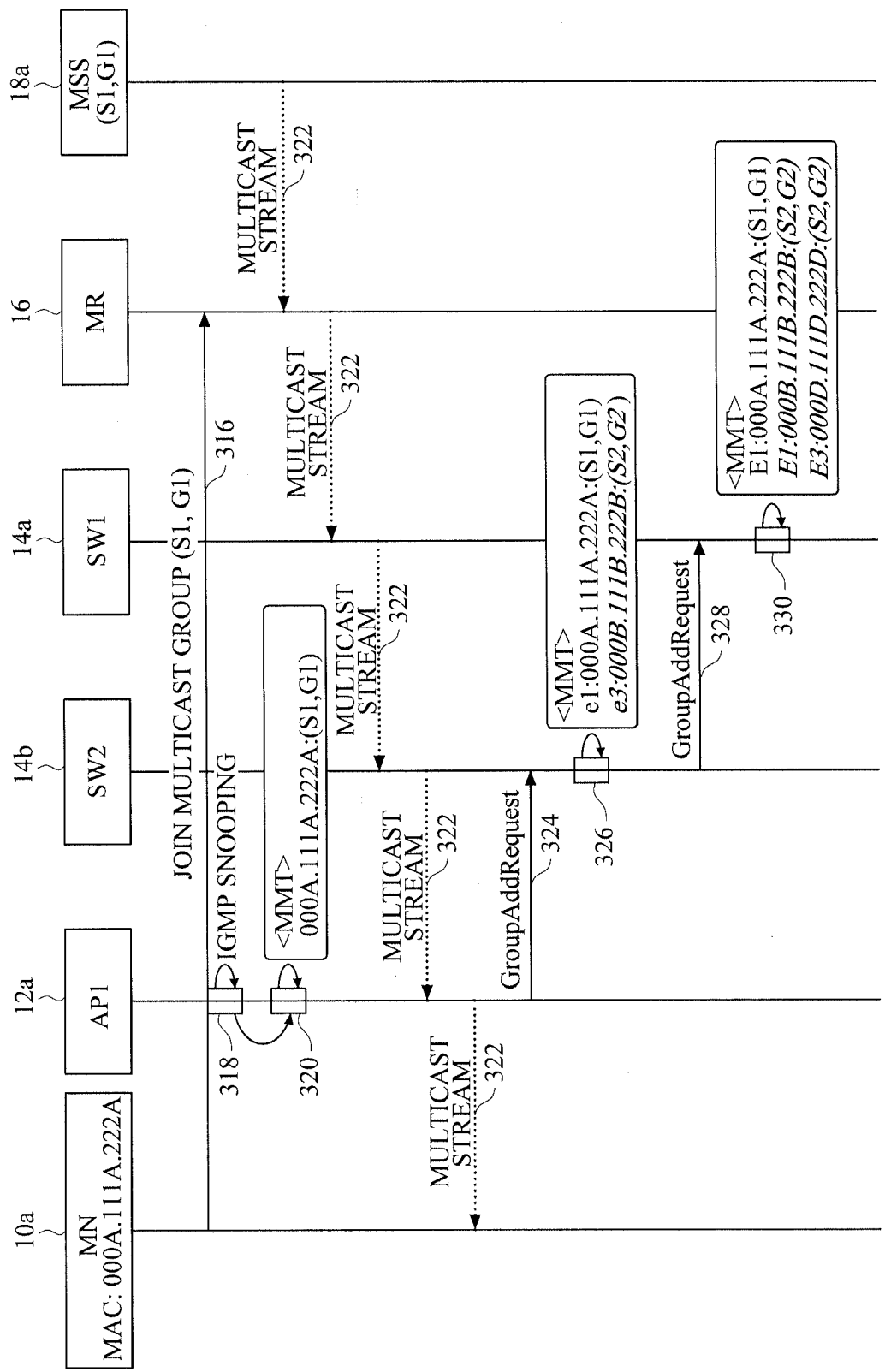

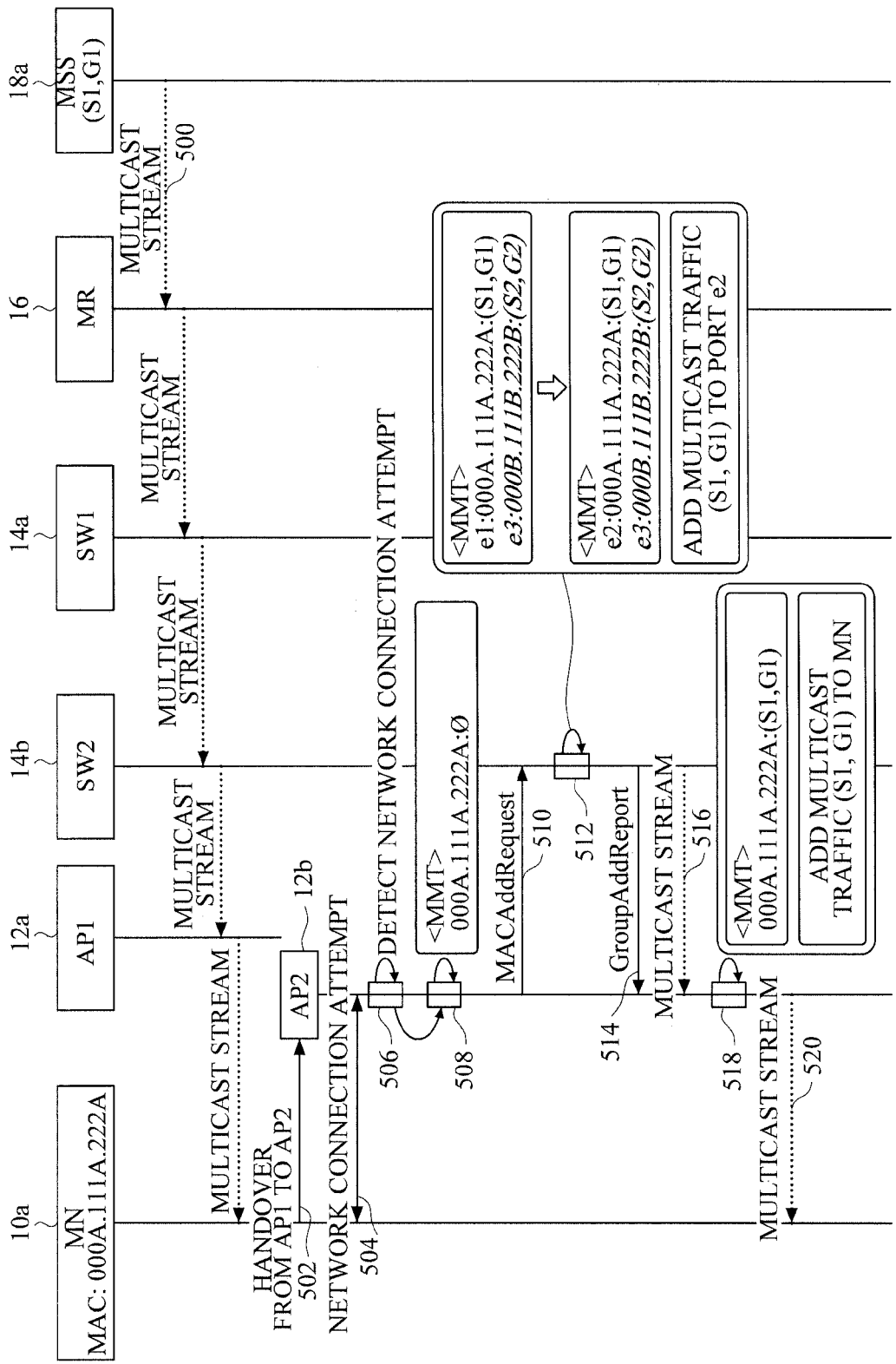

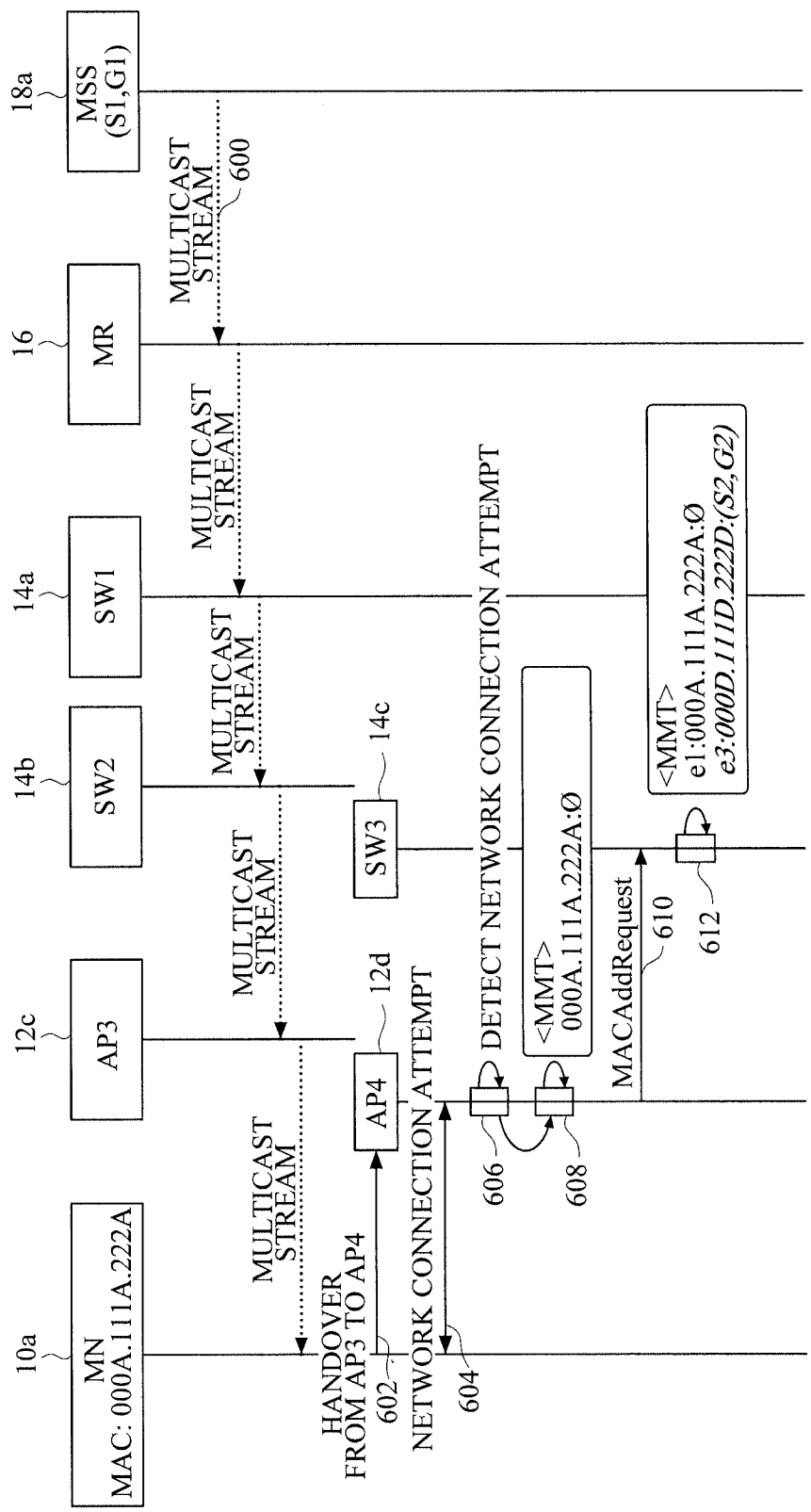

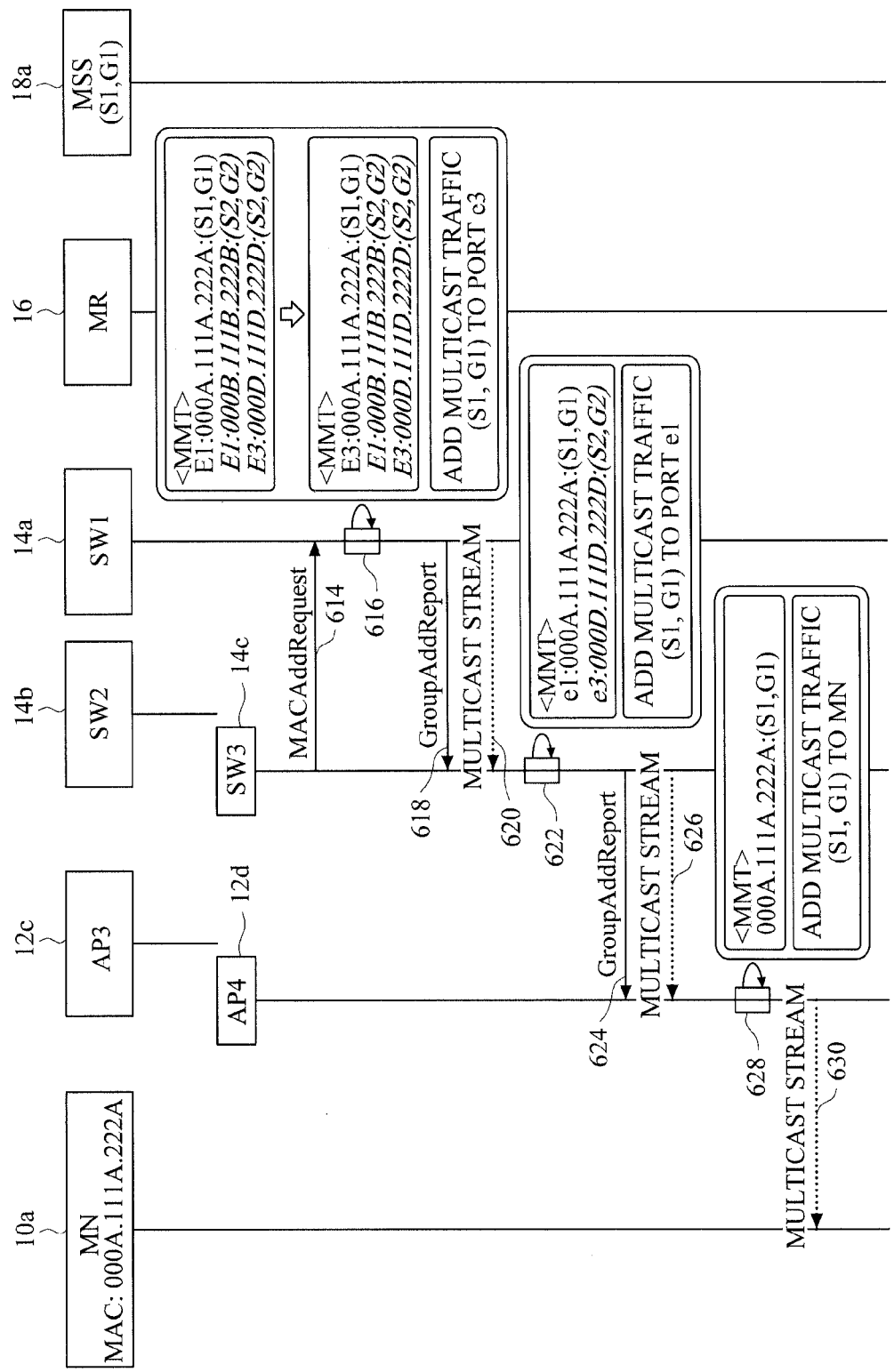

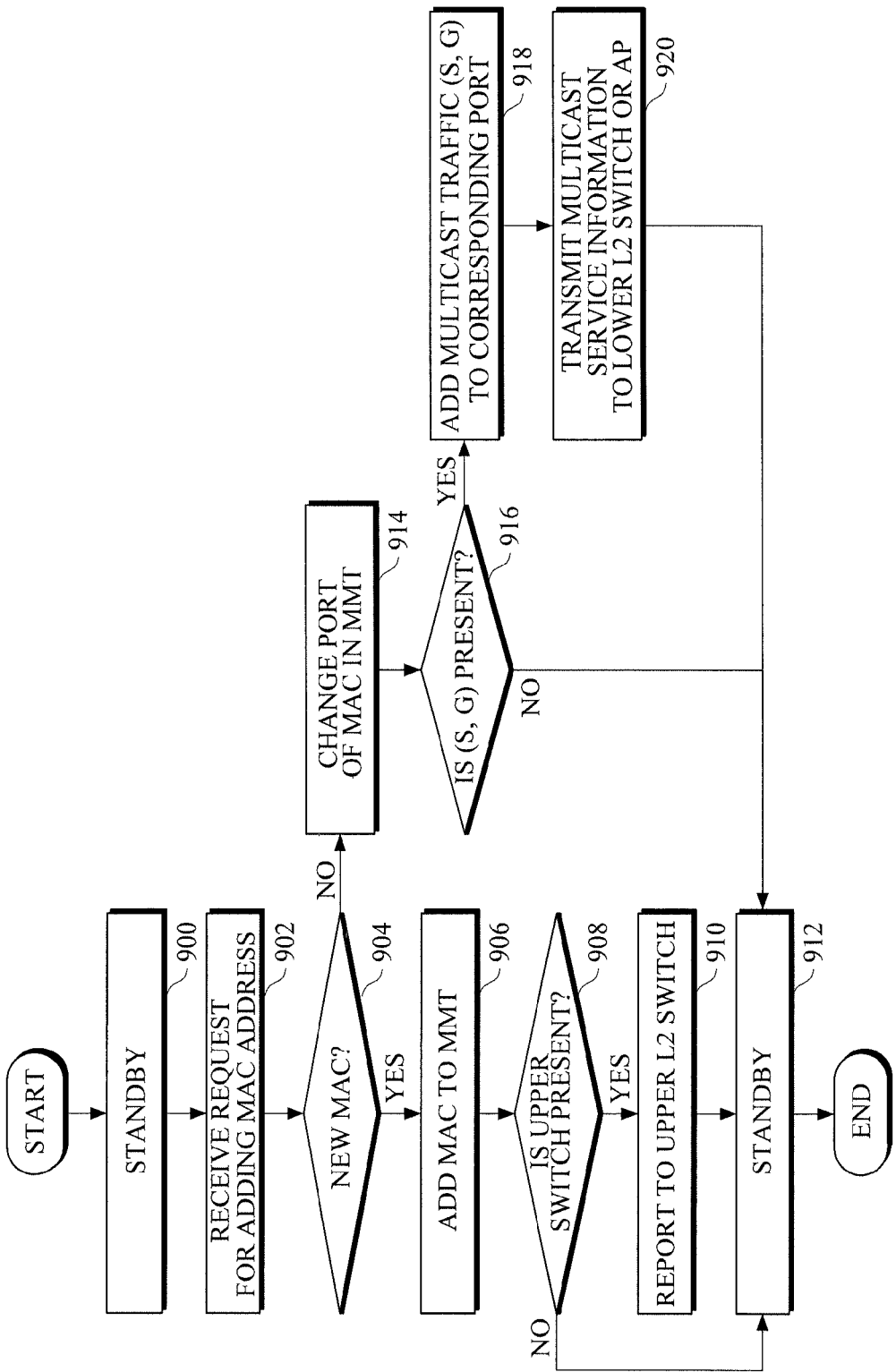

ACCESS POINT, L2 SWITCH AND METHOD OF SUPPORTING MULTICAST HANDOVER USING THE ACCESS POINT AND L2 SWITCH

CROSS-REFERENCE TO RELATED APPLICATION(S)

This application claims the benefit under 35 U.S.C. §119(a) of Korean Patent Application No. 10-2010-0118794, filed on Nov. 26, 2010, in the Korean Intellectual Property Office, the entire disclosure of which is incorporated herein by reference for all purposes.

BACKGROUND

1. Field

The following description relates to a network technology, and more particularly, to a technology for supporting multicast handover for a mobile node.

2. Description of the Related Art

Unicasting transmits data to a single receiver, whereas broadcasting transmits data to all receivers in a network. In contrary, multicasting transmits data to a specific group of receivers in the network. In IP multicasting, in response to a single data packet transmitted from a multicast source, the data packet is replicated as many as the number of receivers that are willing to receive a corresponding source in a network and the replicated packets are delivered to the receivers. Thus, less overhead is incurred to the source which requires transmitting a replicated packet as many times as the number of the receivers and bandwidth can be saved since less number of packets are transmitted over the network, compared to the other transmission schemes.

Various application services based on multicast have been provided. With the fast development of mobile terminals including smart phones, a range of targets of the multicast services has varied from fixed hosts to mobile hosts. A mobile host moves from one network to another or from one cell to another in the same network. Hence, a multicast technology for a fixed host additionally requires a technique to process fast and consecutive multicast traffics in a handover situation.

In the multicast processing technique, traffic process is performed independently in layer 3 and layer 2 due to a network structure for a multicast service. For example, in layer 3 (a router level), traffic process is performed by layer 3 network equipment using multicasting routing protocol based on Internet group management protocol (IGMP) or multicast listener discovery (MLD) protocol which is produced by a mobile host. On the other hand, in layer 2, multicast traffic is processed or broadcasted using IGMP snooping scheme.

However, in the case of broadcasting process, efficient use of network resources is difficult.

The IGMP snooping scheme may be dependent on an IGMP message transmitted between the mobile host and a router. In a case where a mobile host moves from one cell to another in use of a multicast service, if the mobile host in a new cell does not generate an IGMP message, it is not possible for an access point (AP) of the new cell and upper layer 2 network equipment to learn that the mobile host is using the multicast service. This may result in stopping the multicast service from being provided to a mobile host user.

To use the multicast service, multicast group membership protocol is necessarily used. Examples of the multicast group membership protocol may include IGMP and MLD protocol.

The IGMP/MLD protocol is signaling protocol for managing multicast groups in an effort to facilitate the indication of multicast groups which include a router and various hosts which form a sub-network. The IGMP protocol may be used in an IPv4 environment, the MLD protocol is used in an IPv6 environment. IGMP/MLD protocol is developed on the basis of a weird network environment. Thus, for a multicast service in a wireless network environment, a modified IGMP/MLD protocol has been actively researched and developed in consideration of the wireless mobile network environment.

The most influential factor for stability and performance of a multicast service in a wireless mobile environment is a wireless section. In a wireless section, resources are very limited, and the data transfer speed is much slower than in a wired section. The limited conditions of the wireless section may cause loss of IGMP/MLD protocol messages between a mobile host and a router for use of the multicast service. For example, such loss of messages may take place during handover while moving images in a multicast scheme is being provided to a mobile host user. Because such handover happens while the user is viewing the moving images in a multicast scheme, the user may consider the handover as more serious than any other events.

Even when no loss of IGMP/MLD protocol messages occurs during handover, handover delay time of multicast traffic is elongated due to a slow data transfer speed in a wireless section. This may cause unsmooth display of the moving images while the user is viewing them.

SUMMARY

The following description relates to a technology for supporting consecutive multicast handover of a mobile mode between cells of layer 2 network equipment based on a mobile wireless communication network.

In one general aspect, there is provided an access point (AP) including: a handover manager configured to manage media access control (MAC) address information of a mobile node connected to a wireless communication network and multicast service source and group information in respect of a multicast service to be provided to the mobile node, and to support, in association with a layer 2 (L2) switch, consecutive multicast handover of the mobile node from one cell to another by providing pieces of the managed information to the L2 switch.

In another general aspect, there is provided a layer 2 (L2) switch including: a multicast handover manager configured to manage, in association with an access point or another L2 switch, media access control (MAC) address information of a mobile node connected to a wireless communication network and multicast service source group information and physical port information in respect of a multicast service to be provided to the mobile node in an effort to to support consecutive multicast handover of the mobile node from one cell to another; and a routing manager configured to add multicast traffic to a physical port designated in response to a request from the multicast handover manager.

In another general aspect, there is provided a method of an L2 switch for supporting multicast handover of a mobile node, the method including: acquiring MAC address information of the mobile node from an access point or a lower L2 switch; determining whether the acquired MAC address information has been registered; and if it is determined that the MAC address information has been registered, updating physical port information to information of a physical port to which the mobile node is being connected, and adding multicast traffic to the updated physical port.

In another general aspect, there is provided a method of an L2 switch for supporting multicast handover of a mobile node, the method including: acquiring MAC address information of the mobile node from an access point; storing the acquired MAC address information, and reporting connection of a new mobile node along with the stored MAC address information to an upper L2 switch; and updating multicast service information to multicast service source and group information of a multicast service which is provided through the upper L2 switch, and adding multicast traffic to a physical port through which multicast traffic is to be transmitted to the mobile node.

In another general aspect, there is provided a method of an access point for supporting consecutive multicast handover of a mobile mode, the method including: acquiring MAC address information of the mobile node by detecting a network connection attempt of the mobile node; storing the acquired MAC address information and reporting connection of the mobile node along with the stored MAC address information to an L2 switch; and adding multicast service source and group information in response to a request from the L2 switch which confirms, based to on the reporting result, that the mobile node is handed over to the access point and being provided with a multicast service, and transmitting multicast traffic to the mobile node.

Other features and aspects may be apparent from the following detailed description, the drawings, and the claims.

BRIEF DESCRIPTION OF THE DRAWINGS

FIGS. 3A and 3B are flowcharts illustrating process of an MN to join a multicast group at the first connection to a wireless network where the multicast group has an MSS as a source.

FIGS. 5A and 5B are flowcharts illustrating an example of a process for supporting consecutive multicast handover for an MN where the MN performs multicast handover to an L2 switch directly connected to the MN.

FIGS. 6A and 6B are flowcharts illustrating an example of a process for supporting consecutive multicast handover for an MN where the MN perform multicast handover to an upper L2 switch of an L2 switch directly connected to the MN.

FIGS. 9A to 9D are flowcharts illustrating an example of a process performed by an MTHM of an L2 switch to support consecutive mobile multicast traffic handover of a wireless-communication-network-based MN.

Figure 1:
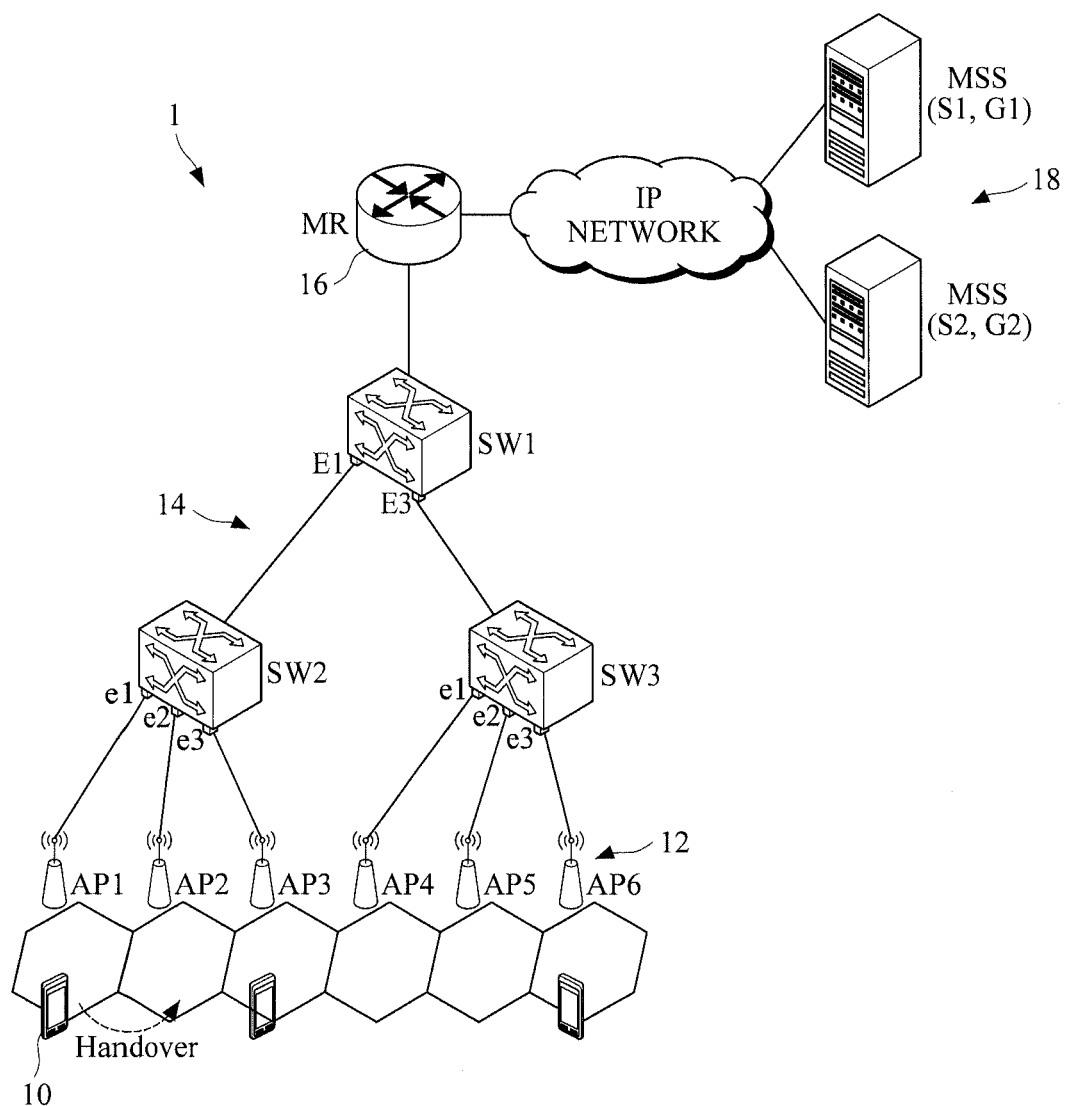
FIG. 1 is a diagram illustrating an example of a configuration of a wireless communication network system which supports consecutive multicast handover of a mobile node moving from one cell to another.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of a configuration of a wireless communication network system which supports consecutive multicast handover of a mobile node moving from one cell to another.

Referring to FIG. 1, the wireless communication network system may include a mobile node (hereinafter, will be referred to as MN) 10, an access point (hereinafter, will be referred to as AP) 12, a layer 2 (L2) switch 14, a multicast router (hereinafter, will be referred to as MR) 16, and a multicast stream server (hereinafter, will be referred to as MSS) 18.

The MR 16 may be a router to support a multicast service. The MSS 18 may be a stream server to function as a source of the multicast service. The L2 switch 14 may perform data transfer on layer 2 between the MN 10 and the AP 12. The AP 12 may be wireless access equipment through which the MN 10 is connected to the network. The L2 switch 14 and the AP 12 may include functions to support consecutive and fast handover of mobile multicast traffic. The MN 10 is to perform handover between cells while in motion in a mobile wireless communication network, and may be, for example, a mobile communication terminal or the like.

Figure 2:
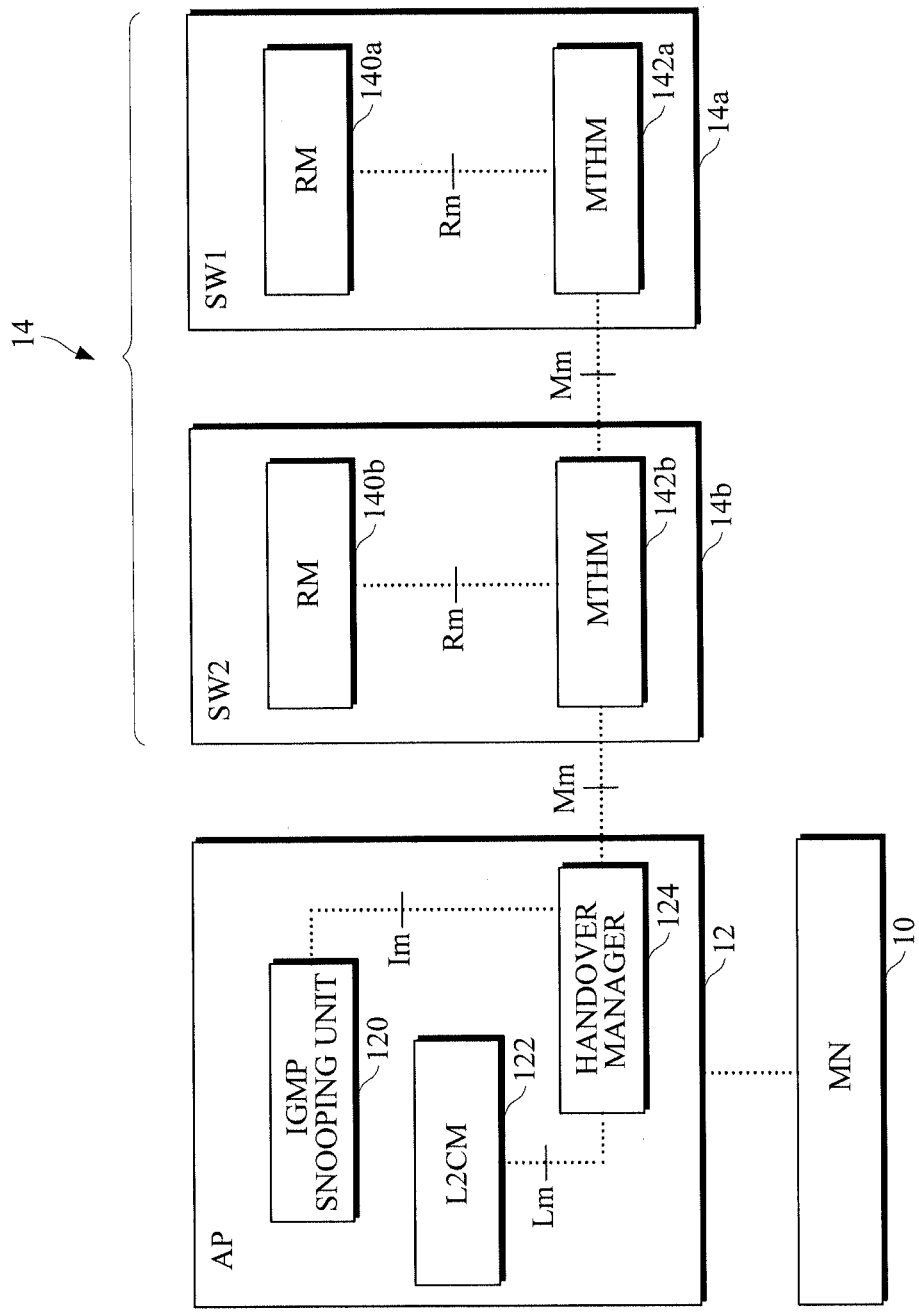
FIG. 2 is a diagram illustrating an example of a detailed configuration of the AP and the L2 switch shown in the example illustrated in FIG. 1.

FIG. 2 illustrates an example of a detailed configuration of the AP and the L2 switch shown in the example illustrated in FIG. 1.

Referring to FIG. 2, the AP 12 may include an Internet group management protocol (IGMP) snooping unit 120, an L2 connection manager (hereinafter, will be referred to as L2CM) 122, and a handover manager 124 in an effort to support consecutive and fast handover of mobile multicast traffic.

The IGMP snooping unit 120 may snoop an IGMP message which is generated for the MN 10 to be provided with a multicast service. The L2CM 122 may detect an attempt of the MN 10 to access the network.

The handover manager 124, that is, a multicast traffic handover manager (hereinafter, will be referred to as MTHM) 124 may receive IGMP snooping information from the IGMP snooping unit 120, and receive a media access control (MAC) address information of the MN 10 from the L2CM 122. In addition, the MTHM 124 may manage, in association with the L2 switch 14, the MAC address information of the MN 10, and multicast service source and group information S, G in respect to the multicast service to be provided to the MN 10 so as to support consecutive multicast handover between cells. The MAC address information may be provided by the L2CM 122 at the first connection of the MN 10 to the network. The IGMP snooping unit 120 may snoop the IGMP message when the MN 10 generates the IGMP message to use the multicast service, and the IGMP snooping unit 120 may transmit the snooped information to the MTHM 124. Multicast handover support process which is performed by the MTHM 124 of the AP 12 in respect to the MN 10 will be described later with reference to FIGS. 8A to 8D.

The L2 switch 14 may be formed by a plurality of L2 switches SW1 14a and SW2 14b, and each of the L2 switches SW1 14a and SW2 14b may include a multicast traffic handover manager (MTHM) and a routing manager (RM) in an effort to support consecutive handover of multicast traffic for the MN 10. For example, as shown in FIG. 2, the L2 switch SW1 14a may include an MTHM 142a and an RM 140a, and the L2 switch SW2 14b may include an MTHM 142b and an RM 140b.

Each MTHM 142a and 142b may manage, in association with the AP 12 or another L2 switch, the MAC address information of the MN 10 connected to a wireless communication network, multicast service source and group information S, G in respect to the multicast service provided to the MN 10, and physical port information in an effort to support consecutive multicast handover. Multicast handover support process which is performed by the MTHM 142a and 142b of each of the L2 switches SW1 14a and SW2 14b in respect to the MN will be described later with reference to FIGS. 9A to 9D.

Each RM 140a and 140b may add multicast traffic to a designated physical port in response to a request of each MTHM 142a and 142b.

Multicast join support process, multicast handover support process and multicast leave process of the MN 10 through the AP 12 and L2 switch 14 will be described in detail with reference to FIGS. 3A to 7.

FIGS. 3A and 3B are flowcharts illustrating process of an MN to join a multicast group at the first connection to a wireless network where the multicast group has an MSS as a source.

Referring to FIG. 3A, the MN 10a having an MAC address of '000A.111A.222A' attempts to access the wireless network (L2 association establishment: 300). At this time, an L2CM of an application program interface (API) 12a detects the attempt of the MN 10a to access the network (L2 link up trigger: 302), and provides the MAC address information of the MN 10a to an MTHM. In preparation for the future use of a multicast service by the MN 10a, the MTHM searches a mobile multicast table (MMT) to check whether the received MAC address has been already registered. If the MAC address has not been yet registered, the MAC address information is stored (304). When storing the MAC address information, Ø may be stored to indicate that the corresponding MN 10a has not yet used a specific multicast service. Thereafter, the MTHM of the API 12a transmits MAC address information (MACAddRequest message) to an MTHM of an L2 switch SW2 14b which is an upper L2 switch through a control channel (306).

In response to reception of the MACAddRequest message, the MTHM of the L2 switch SW2 14b stores the MAC address information in the MMT, as well as physical port information e1 which is connected to the API 12a (308). After storing the information, the SW2 14b transmits the stored MAC address information (MACAddRequest message) to an SW1 14a which is an upper L2 switch (310). In response to reception of the MACAddRequest message, the SW1 14a stores the MAC address information and the physical port information e1 in the MMT in the same manner as the SW2 14b (312). Accordingly, an initial connection is completed (314).

Referring to FIG. 3B, after the completion of the initial connection process as shown in FIG. 3A, the MN 10a joins a multicast group G1 that has S1 as a source to start a multicast service to be provided (Multicast Group S1, G1 Join: 316).

In this case, when an IGMP message is snooped by an IGMP snooping unit of the API is 12a (318) and IGMP snooping information is transmitted to the MTHM, the MTHM stores the multicast service information S1, G1 at a MAC address of the corresponding MN 10a in the MMT (320). Actual multicast traffic is transmitted from an MSS 18a to the MN 10a (322). Thereafter, the API 12a transmits the multicast service information S1, G1 (GroupAddRequest message) of the corresponding MN 10a to the SW2 14b (324).

In response to reception of the GroupAddRequest message, the SW2 14b stores the multicast service information S1, G1 in the MMT (326), and transmits the GroupAddRequest message to the SW1 14a which is an upper L2 switch (328). The SW1 14a which has received the GroupAddRequest message stores the multicast service information S1, G1 in the same manner as the SW2 14b (330).

For reference, pieces of information represented by italic letters in each MMT shown in FIGS. 3A and 3B are examples of information including MAC address information, multicast service information S1, G1, and physical port information of other MNs that have connected to the network and joined the multicast service already according to the process shown in FIGS. 3A and 3B.

Figure 4:
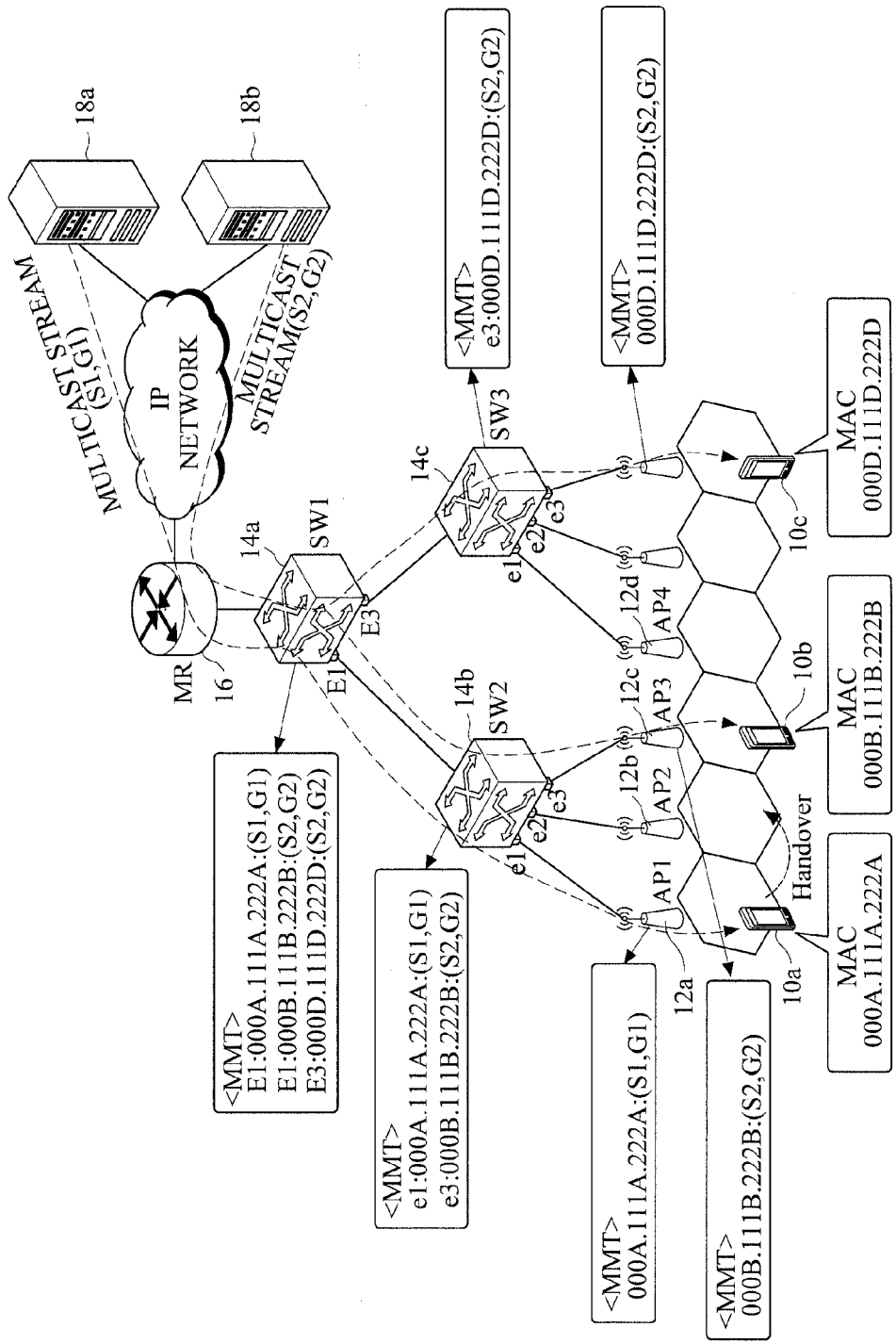
FIG. 4 is a diagram illustrating examples of layer states of each MMT on each layer of network equipment and a multicast traffic flow when the join process shown in FIGS. 3A and 3B has been completed.

FIG. 4 illustrates a diagram for showing examples of layer states of each MMT on each layer of network equipment and a multicast traffic flow when the join process shown in FIGS. 3A and 3B has been completed.

In FIG. 4, examples of pieces of information are shown, which include MAC address information of MNs 10a, 10b, and 10c which have connected to a network and joined a multicast service according to the process as shown in FIGS. 3A and 3B and pieces of MAC address information, multicast service information 51, G1 and physical port information which are to be stored in APs 12a, 12b, 12c, and 12d, and L2 switches 14a, 14b, and 14c. The multicast handover support process for the MN 10a will be described in detail with reference to FIGS. 5A, 5B, and 6B along with the layer states of each MMT of network equipment shown in FIG. 4.

Figure 5B:
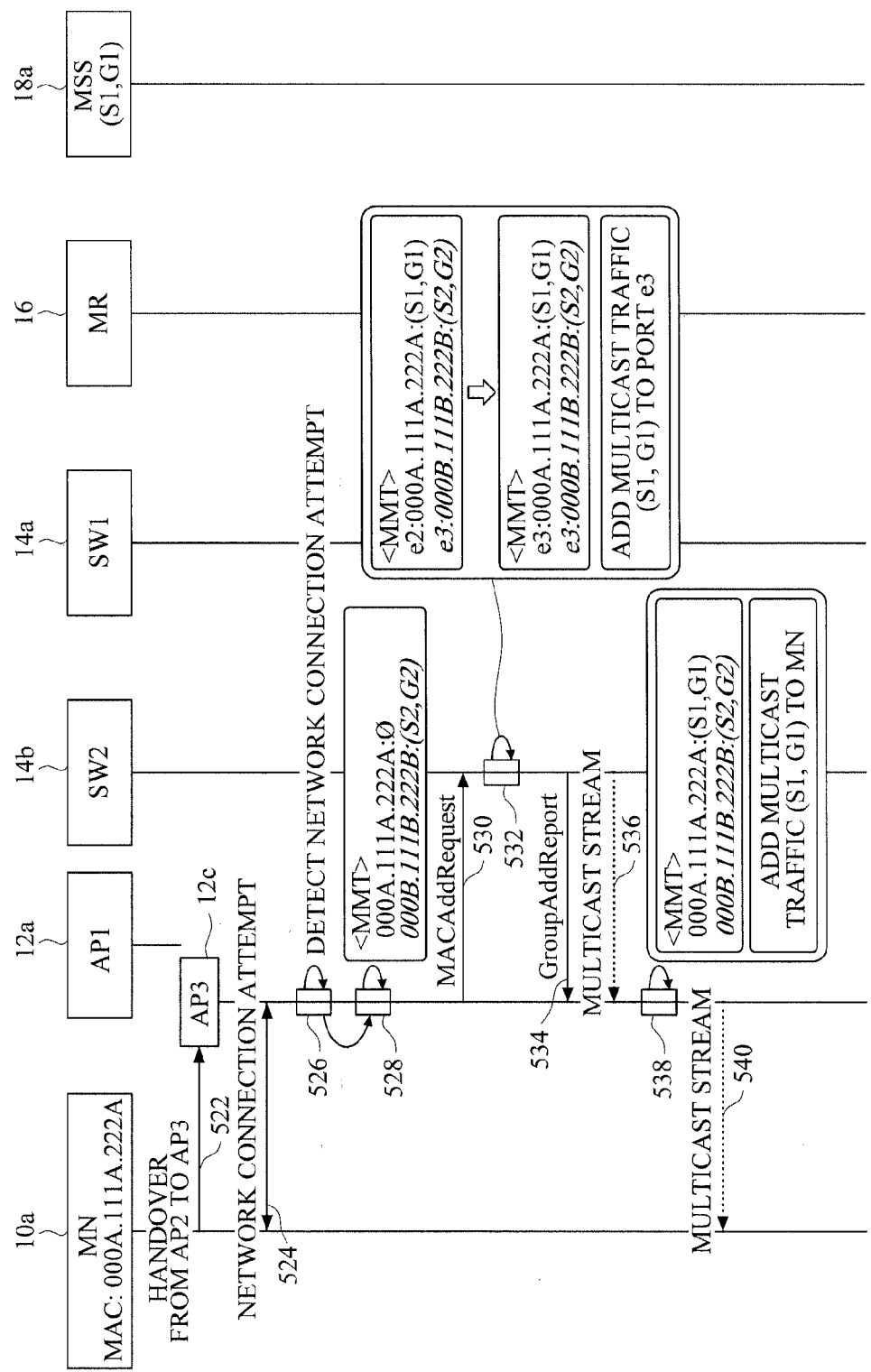

FIGS. 5A and 5B illustrate flowcharts of an example of a process for supporting consecutive multicast handover for an MN where the MN performs multicast handover to an L2 switch directly connected to the MN.

FIG. 5A illustrates a flowchart of a process for supporting consecutive multicast handover when the MN 10a attempts to perform handover from an AP1 12a to an AP2 12b, and FIG. 5B illustrates a flowchart of a process for supporting consecutive multicast handover when the MN 10a attempts to perform handover from the AP2 12b to an AP3 12c.

Referring to FIG. 5A, the MN 10a accesses a wireless network for the first time to join a multicast group G1 which has an MSS 18a as a source S1, and is provided with a multicast service S1, G1 through the AP1 12a (500). In this case, the MN 10a attempts network connection to the AP2 12b (L2 Association Establishment: 504) for handover to the AP2 12b (502).

An L2CM of the AP2 12b detects the network connection attempt of the MN 10a (L2 Link up trigger: 506), and transmits MAC address information of the MN 10a to an MTHM of the AP2 12b. The MTHM stores the MAC address information in an MMT in preparation for the future use of the multicast service (508). When storing the MAC address information, Ø may be stored to indicate that the corresponding MN 10a has not yet used a specific multicast service. Additionally, the MTHM of the AP2 12B transmits the MAC address information (MACAddRequest message) to a SW2 14c through a control channel (510).

In response to reception of the MACAddRequest message, an MTHM of the SW2 14b searches an MMT to check whether a corresponding MAC address has been already registered. If it is determined that the MAC address has been already registered, it is interpreted that the MN 10a has handed over from a different AP to the current AP. In addition, it is determined that the corresponding MN 10a has been already using the multicast service S1, G1. An MTHM of a SW2 14b which confirms the MN's current condition updates physical port information to a physical port e2 to which the MN 10a is currently connected (e1→e2). Thereafter, the multicast traffic S1, G1 which is in use by the MN 10a is added to the updated physical port e2 in an effort to transmit the multicast traffic to the AP2 12b (516). Then, the SW2 transmits a message (GroupAddReport) that indicates the corresponding MN 10a is using the multicast service to the AP2 12b through the control channel (514).

In response to reception of the GroupAddReport information, the AP2 12b updates a value of a multicast service information field in the MAC of the MN 10a (Ø→(S1,G1)) (518), and transmits the multicast traffic to the MN 10a (520).

The MN 10a which has handed over from the AP1 12a to the AP2 12b while being provided with the multicast service from the AP1 12a through the processes 500 to 520 is enabled to be provided with the mobile multicast service fast and seamlessly through internal processes of the minimum amount of layer 2 network equipment without additional activities.

Referring to FIG. 5B, where the MN 10a hands over from the AP2 12b to the AP3 12C, the same processes are performed as where the MN 10a hands over from the AP1 12a to the AP2 12B as shown in FIG. 5A. Accordingly, the MN 10a may be enabled to be provided with fast and seamless multicast service during handover to AP3 12c. The processes of the MN 10a handing over from the AP2 12b to the AP3 12c are the same as the processes 522 through 540 to shown in FIG. 5a, and thus they will not be reiterated.

FIGS. 6A and 6B illustrate flowcharts of an example of a process for supporting consecutive multicast handover for an MN where the MN perform multicast handover to an upper L2 switch of an L2 switch directly connected to the MN.

While the process shown in FIGS. 5A and 5B is performed for a handover within the L2 is switch to which the AP is directly connected, the process shown in FIGS. 6A and 6B is for handover performed between an L2 switch to which an AP is directly connected and an upper L2 switch of the L2 switch.

Referring to FIG. 6A, the MN 10a which is using a multicast service S1, G1 that is provided by an MSS 18a through the AP3 12c attempts network connection to an AP4 12d for a handover to the AP4 12d (L2 Association Establishment: 604).

An L2CM of the AP4 12d detects the network connection attempt of the MN 10a (L2 Link up trigger: 606), and provides the MAC address information of the MN 10a to an MTHM of the AP4 12d. The MTHM of the AP4 12d stores the MAC address information in an MMT in preparation for the future use of the multicast service (608). When storing the MAC address information, Ø may be stored to indicate that the corresponding MN 10a has not yet used a specific multicast service. Then, the MTHM of the AP4 12d may transmit the MAC address information (MACAddRequest message) to the SW3 14c through a control channel (610).

In response to reception of the MACAddRequest message, an MTHM of the SW3 14c searches the MMT to check whether the corresponding MAC has been already registered. If it is determined that the MAC has not been registered, the MTHM stores the MAC address information (612). When storing the MAC address information, Ø may be stored to indicate that the corresponding MN 10a has not yet used a specific multicast service.

Referring to FIG. 6B, the MTHM of the SW3 14c transmits the MAC address to information (MACAddRequest message) to an MTHM of a SW1 14a which is an upper L2 switch through the control channel (614). In response to reception of the MACAddRequest, the MTHM of the SW1 14a searches an MMT to check whether the corresponding MAC address has been already registered. If it is determined that the MAC address has been registered in the MMT, it is interpreted that the corresponding MN 10a has been handed over from a different AP is (i.e., 12c) to the current AP (i.e., 12d). Furthermore, the MTHM of the SW1 14a recognizes a situation that the MN 10a is using the multicast service S1, G1. In response to the recognition, the SW1 14a updates the physical port information to a physical port E3 to which the MN 10a is currently connected (E1→E3). The multicast traffic S1, G1 that is being used by the MN 10a is added to the updated physical port E3 (616), and is transmitted to the SW3 14c (620). Thereafter, the MTHM of the SW1 14a transmits a messages (GroupAddReport message) which indicates that the corresponding MN 10a is already using the multicast service to the SW3 14c through the control channel (618).

In response to reception of the GroupAddReport message, the SW3 14c updates a value of a multicast service information field for a MAC of the MN 10a in the MMT (Ø→(S1, G1)) (622), and transmits the multicast traffic to the AP4 12d to which the MN 10a is currently connected (626).

In addition, the SW3 14c transmits the message (GroupAddReport) which indicates that the MN 10a is already using the multicast service to the AP4 12d through the control channel (624).

In response to reception of the GroupAddReport, the AP4 12d updates a value of the multicast service information field for the MAC of the MN 10a in the MMT (Ø→(S1,G1))(628), and transmits the multicast traffic to the MN 10a (630).

The MN 10a which has handed over from to the AP4 12d while being provided with the multicast service through the processes described above may be enabled to be provided with a fast and seamless multicast service only through internal processes of a minimum amount of layer 2 network equipment without additional activities.

Figure 7A:
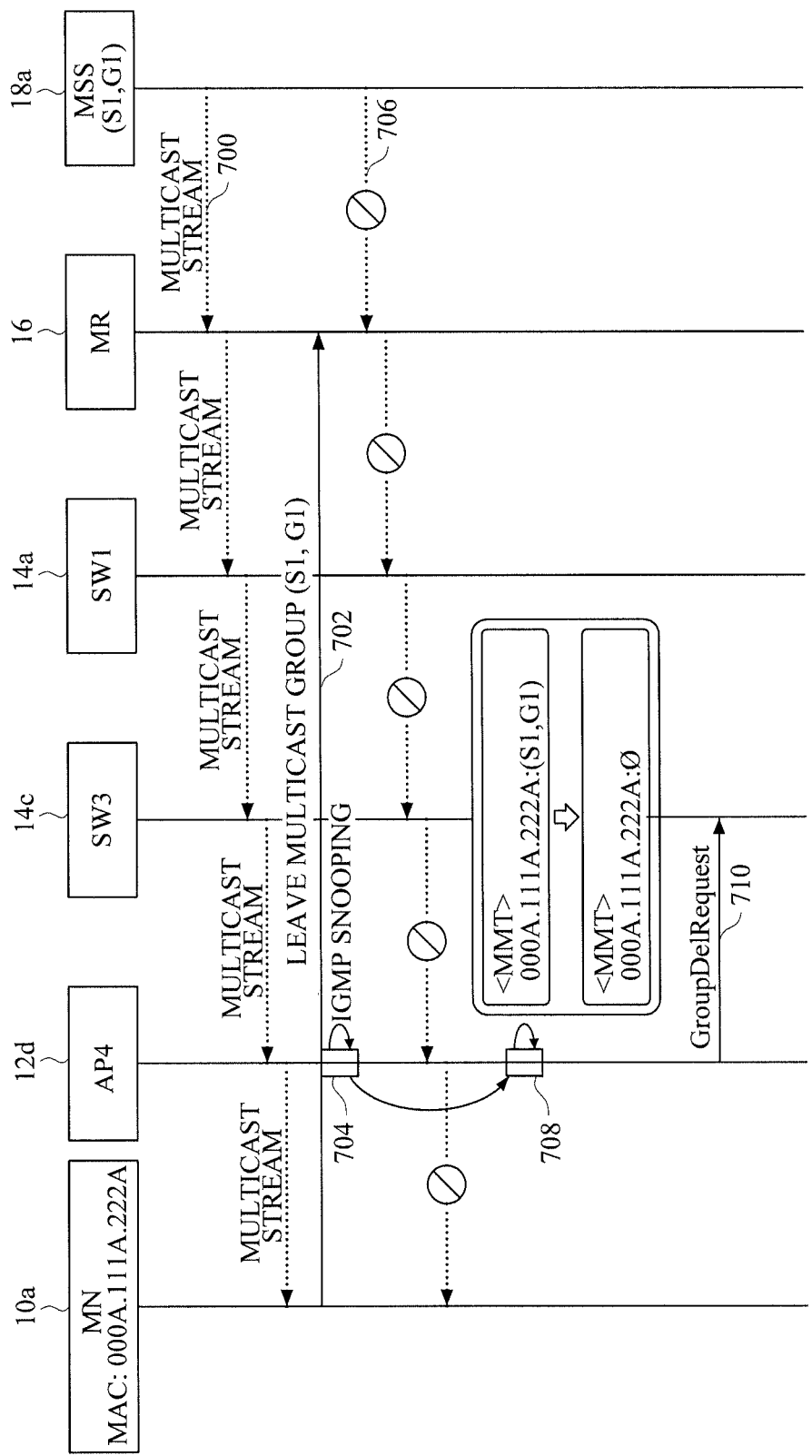
FIGS. 7A and 7B are flowcharts illustrating an example of a process of an MN leaving a multicast service which is being provided by joining a multicast group that has an MSS as a source.
Figure 7B:
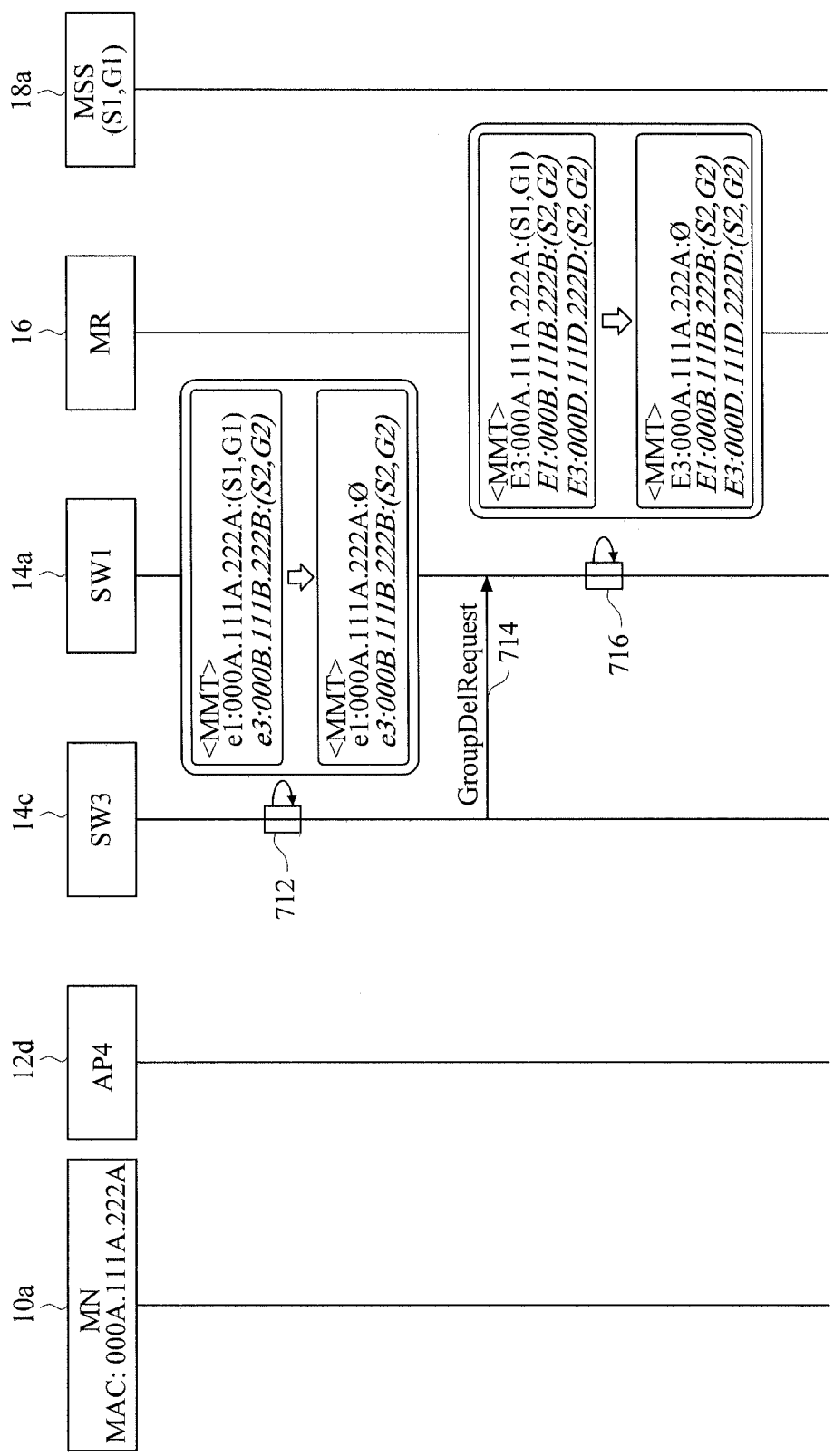

FIGS. 7A and 7B illustrate flowcharts of an example of a process of an MN leaving a multicast service which is being provided by joining a multicast group that has an MSS as a source.

Referring to FIG. 7A, the MN 10a having '000A.111A.222A' as an MAC address is connected to an AP4 12d, joins the multicast group G1 having the MSS 18a as a source S1, and is provided with the multicast service (700). While being provided with the multicast service in operation 700, the MN 10a leaves the multicast service (Multicast Group Leave (S1, G1)) (702).

In response to the MN's 10a leaving, an IGMP snooping unit of the AP4 12d snoops an IGMP message (704), and transmits it to an MTHM of the AP4 12d. In response, the MTHM updates Mac address information of the corresponding MN 10a in an MMT ((S1,G1)→Ø)(708). Regardless of such a control message, an actual multicast traffic transmission from the MSS 18a to the MN 10a is cancelled (706). After storing the information, the AP4 12d transmits a multicast service information deletion request message (GroupDelRequest message) of the corresponding MN 10a to a SW3 14c which is an upper L2 switch (710).

Referring to FIG. 7B, an MTHM of the SW3 14c which has received the GroupDelRequest message updates multicast service information at an MAC address of the MN 10a in an MMT ((S1,G1)→∅)(712). After storing the multicast service information, the SW3 14c transmits the multicast service information deletion request message (GroupDelRequest message) to a SW1 14a which is an upper L2 switch (714). In response to reception of the GroupDelRequest message, an MTHM of the SW1 14a updates the multicast service information at an MAC address of the MN 10a in an MMT ((S1, G1)→∅)(716).

FIGS. 8A to 8D illustrate flowcharts of an example of a process performed in an MTHM of an AP 12 to support consecutive mobile multicast traffic handover of a wireless-communication network based MN.

Referring to FIG. 2 again, the TMHM 124 of the AP 12 manages, in association with the MTHMs 142a and 142b of the upper L2 switches 14a and 14b which are connected to the AP 12, the MAC address information of the connected MN 10 and multicast source and group information S, G. The MAC address information may be provided by the L2CM 122 at the first network connection of the MN 10. The IGMP snooping unit 120 snoops an IGMP message when the MN 10 generates the IGMP message for the use of a multicast service, and transmits the IGMP snooping information to the MTHM 124.

The MTHM 124 of the AP 12 analyzes a message which has been received in message receiving standby mode and performs process required by the analyzed message. There may be four types of messages, including a network connection attempt message (hereinafter, will be referred to as a 'L2 Link up trigger message'), an IGMP join message (hereinafter, will be referred to as a 'IGMP snooping:IGMP join message'), an IGMP leave message (hereinafter, will be referred to as a 'IGMP snooping:IGMP leave message') and a multicast service source and group information add request message (hereinafter, will be referred to as a 'GroupAddReport message').

A process for processing each type of message described above will be described in detail with reference to FIGS. 8A to 8D. For convenience of explanation, the same reference numerals as shown in FIG. 2 will be used in FIGS. 8A to 8D.

Figure 8A:
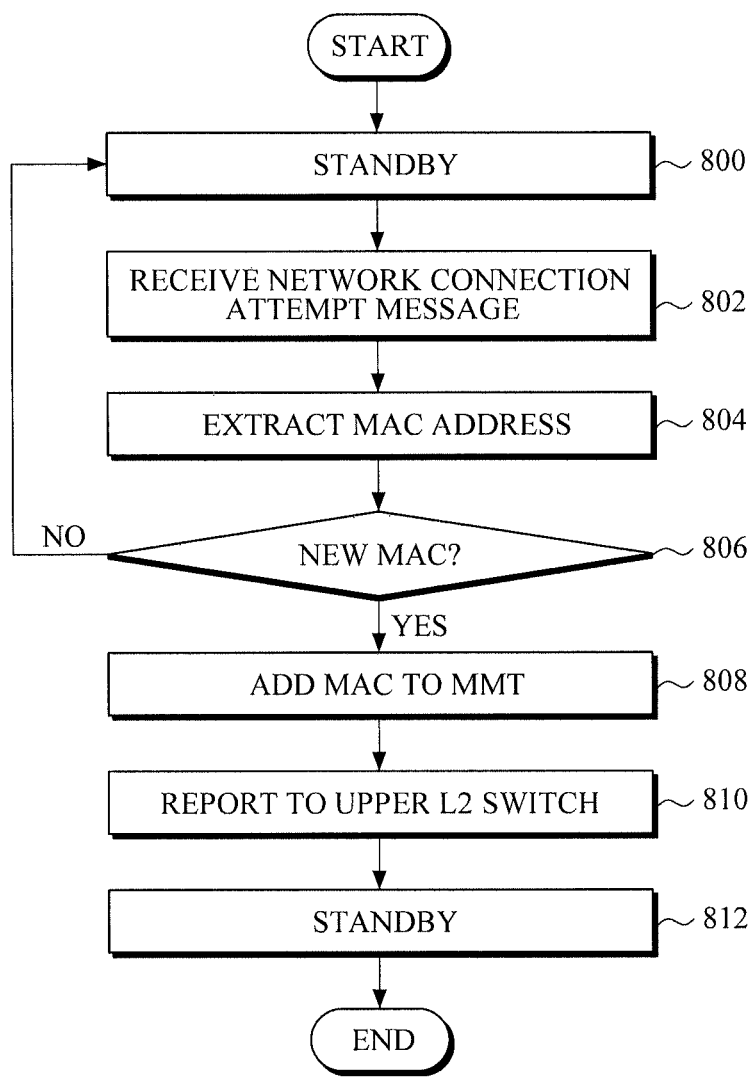
FIGS. 8A to 8D are flowcharts illustrating an example of a process performed in an MTHM of an AP 12 to support consecutive mobile multicast traffic handover of a wireless-communication network based MN.

Referring to FIG. 8A, in message receiving standby mode (800), the MTHM 124 of the AP 12 receives the L2 Link up trigger message from the L2CM 122 (802), and then extracts MAC address information from the received L2 Link up trigger message (804). Thereafter, the MTHM 124 checks whether the extracted MAC address has been already registered (806).

If it is determined that the extracted MAC address is a new MAC address which is not registered, the MAC address information is stored in an MMT (808), and a message (MACAddRequest(MAC) message) that includes the stored MAC address information and indicates a new MN 10 has been connected is transmitted to an upper L2 switch (810). Thereafter, the MTHM 124 of the AP 12 enters again the message receiving standby mode (812). On the other hand, if it is determined that the extracted MAC address has been already registered, the MTHM 124 returns to the message receiving standby mode (800).

Figure 8B:
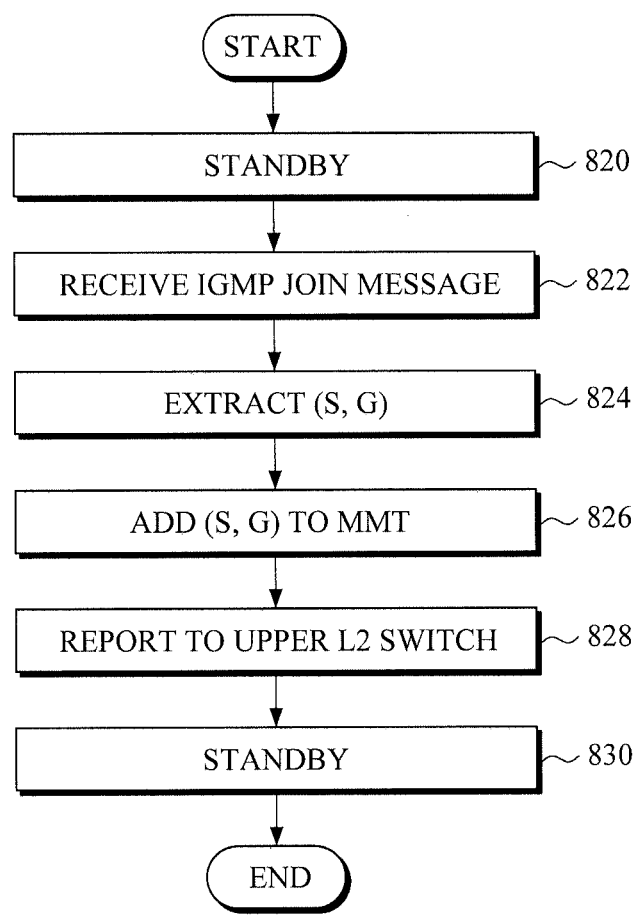

Referring to FIG. 8B, in message receiving standby mode (820), the MTHM 124 of the AP 12 receives an IGMP snooping:IGMP join message from the IGMP snooping unit 120, and then extracts multicast group and source information S, G from the received message (824). Moreover, the MTHM 124 searches the MMT to find MAC address information of the MN 10 and stores the multicast service information S, G at the found MAC address in the MMT (826). After storing, a message (GroupAddRequest(MAC,S,G) message) that includes multicast service information of the MN 10 is transmitted to an upper L2 switch (828), and the MTHM 124 enters again the message receiving standby mode (830).

Figure 8C:
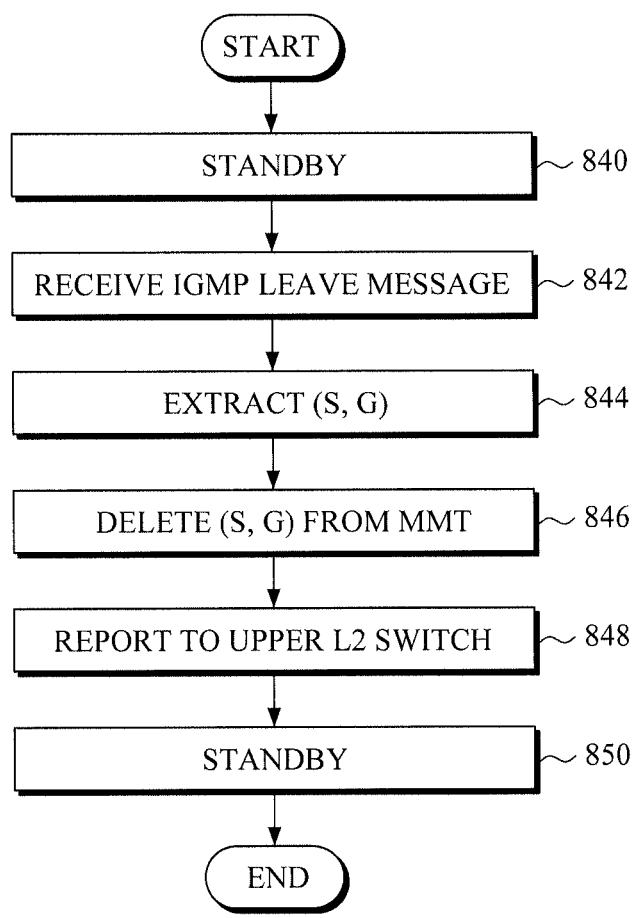

Referring to FIG. 8C, in message receiving standby mode, the MTHM 124 of the AP 12 receives an IGMP snooping: IGMP leave message from the IGMP snooping unit 120 (842), and then extracts multicast group and source information S, G (844). Thereafter, the MTHM 124 searches the MMT to find MAC address information of the corresponding MN 10 and the multicast service information S, G, and deletes a value of a multicast service information field (846). After deletion, the MTHM 124 transmits a multicast service information deletion request message (GroupDelRequest (MAC, S,G) of the MN 10 to an upper L2 switch (848), and enters again message receiving standby mode (850).

Figure 8D:
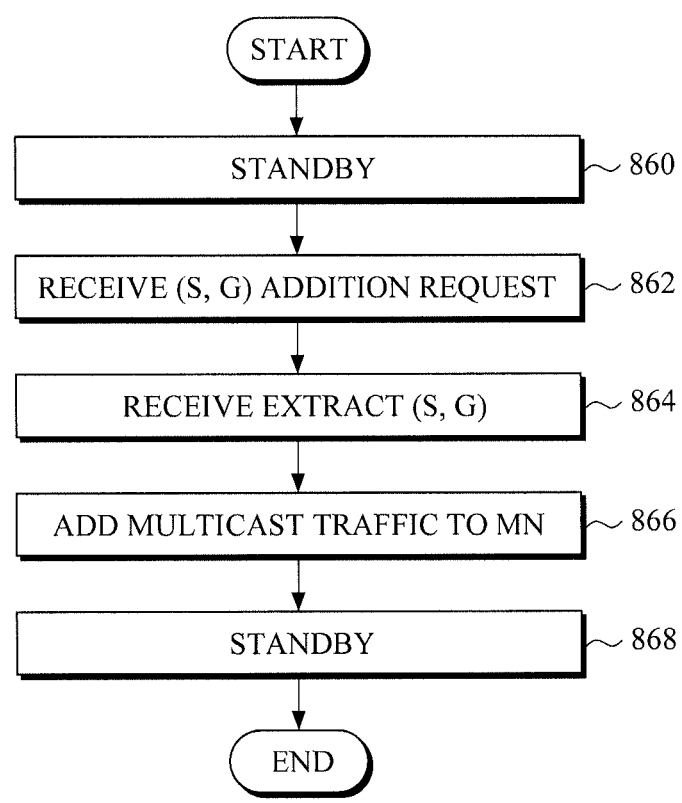

Referring to FIG. 8D, in message receiving standby mode (860), the MTHM 124 of the AP 12 receives a GroupAddReport message from the upper L2 switch (862), and then extracts MAC address information from the received message (864). The MTHM 124 searches the MMT to find the MAC address information to store the multicast service information at the is corresponding MAC address, and adds multicast traffic to the MN 10 (866). Afterwards, the MTHM 124 enters message receiving standby mode (868).

FIGS. 9A to 9D illustrate flowcharts of an example of a process performed by an MTHM of an L2 switch to support consecutive mobile multicast traffic handover of a wireless-communication-network-based MN.

The MTHM of the L2 switch may be associated with MTHMs of upper and lower L2 switches connected to the L2 switch itself, and be associated with an MTHM of an AP connected below the L2 switch. Referring to FIG. 2 again, the MTHM 142b of the SW2 14b may be associated with the MTHM 142b of the SW1 14a which is an upper L2 switch, and may be associated with the HTHM 124 of the AP 12 connected below the SW2 14b. The MTHM 142b of the SW2 14b may manage MAC address information, multicast source and group information S, G and information of a connected physical port of the MN 10 which is connected over the AT 12 and the SW1 14a.

The MTHM of the L2 switch analyzes a message which has been received in message receiving standby mode and processes a corresponding function required by the message. There may four types of messages, including a MAC address addition request message (hereinafter, will be referred to as a 'MACAddRequest message'), a multicast service source and group information addition request message (hereinafter, will be referred to as a 'GroupAddRequest message'), a multicast service source and group information addition report message (hereinafter, will be referred to as a GroupAddReport message'), and a multicast service source and group information deletion request message (hereinafter, will be referred to as a GroupDelRequest message').

Hereinafter, a process for processing each type of message of the MTHM of the L2 switch will be described with reference to FIGS. 9A to 9D. For convenience of explanation, the same reference numerals as shown in FIG. 2 will be used in FIGS. 9A to 9D.

Referring to FIG. 9A, in message receiving standby mode (900), an MTHM 142a of a SW1 14a receives a MACAddRequest message from a SW2 14b or an AP 12 (902), and searches an MMT to find MAC address information (904). If it is determined in operation 904 that the MAC address information requested by the SW2 14b or the AP 12 is a new MAC address, the MAC address information is stored in the MMT (906). If an upper L2 switch is present, a message (MACAddRequest (MAC, port) message) that indicates the connection of a new MN 10 is transmitted to the upper L2 switch, and the MTHM 142a of the SW1 14a enters again message receiving standby mode (912).

On the other hand, if it is determined in operation 904 that the MAC address is not a new MAC address, a value of a physical port information field of the MAC address is updated to a new physical port value in the MMT (914), and the MMT is searched to find a value (S, G) of a multicast service information field of the MAC address (916). If the value is found in operation 916, a request is issued to the RM 140a to add multicast traffic S, G to a corresponding port (918). Thereafter, multicast service information (GroupAddReport (MAC, S, G) message) is forwarded to a lower L2 switch or an AP through a control channel (920). Then, the MTHM 142a of the SW1 enters again message receiving standby mode (912).

Figure 9B:
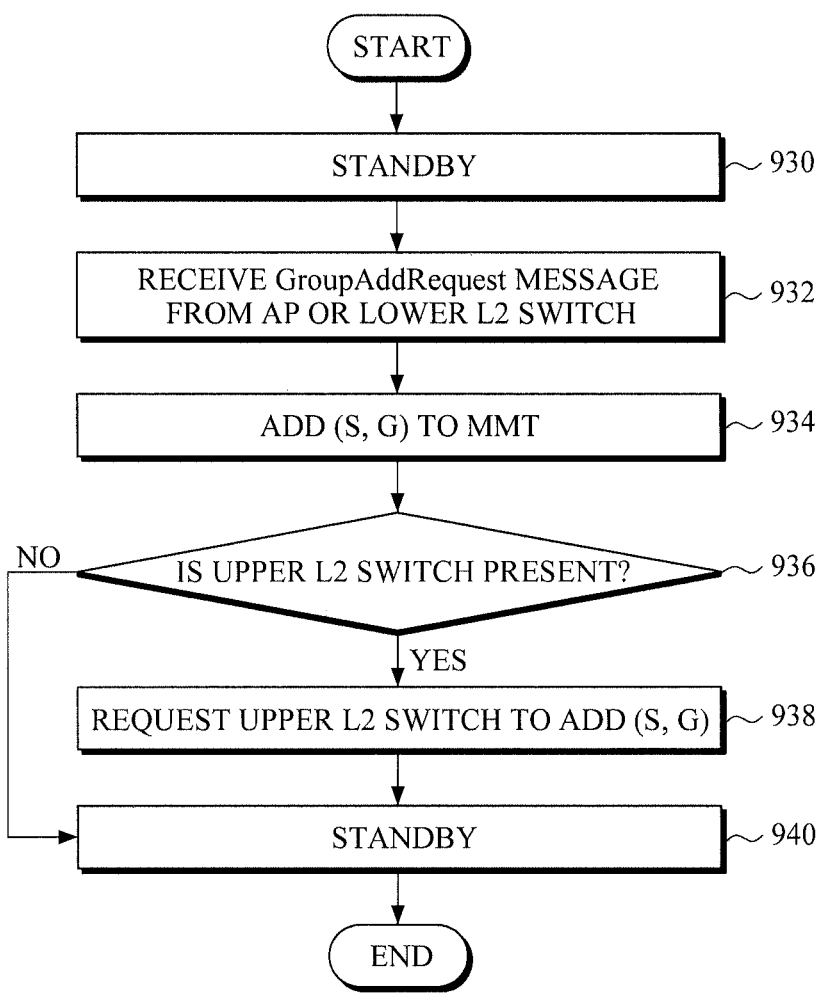

Referring to FIG. 9B, in message receiving standby mode (930), the MTHM 142a of the SW1 14a receives a GroupAddRequest message from the SW2 14b which is a lower L2 switch or the AP 12 (932), and searches the MMT to find MAC address information of a corresponding MN 10 to store multicast service information at the found MAC address information (934). After storing, it is determined whether an upper L2 switch is present (936), and if present, a message (GroundAddRequest (MAC, S, G) message) including the multicast service information of the MN 10 is transmitted to the upper L2 switch (938). Then, the MTHM 142a enters again message receiving standby mode (940). In contrary, after storing the multicast service information, if it is determined that the upper L2 switch is not present, the MTHM 142a enters directly message receiving standby mode (940).

Figure 9C:
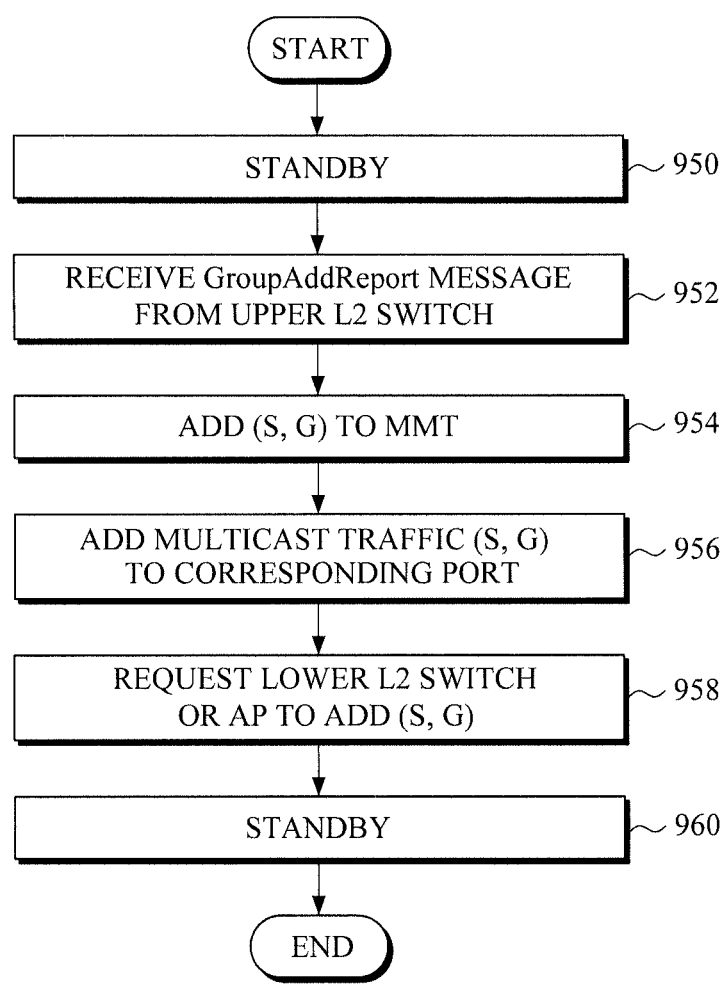

Referring to FIG. 9C, in message receiving standby mode (950), the MTHM 142b of the SW2 14b receives a GroupAddRequest message from the upper L2 switch, i.e., the SW1 14a (952), and searches the MMT to find MAC address information of a corresponding MN 10 to store multicast service information at the found MAC address information (954). After storing, the MTHM 142b issues a request to the RM 140b to add multicast traffic S, G to a corresponding physical port (956), transmits a message (GroupAddReport (MAC, S, G) message) including the multicast service information of the MN 10 to a lower L2 switch or the AP (958), and enters again message receiving standby mode (960).

Figure 9D:
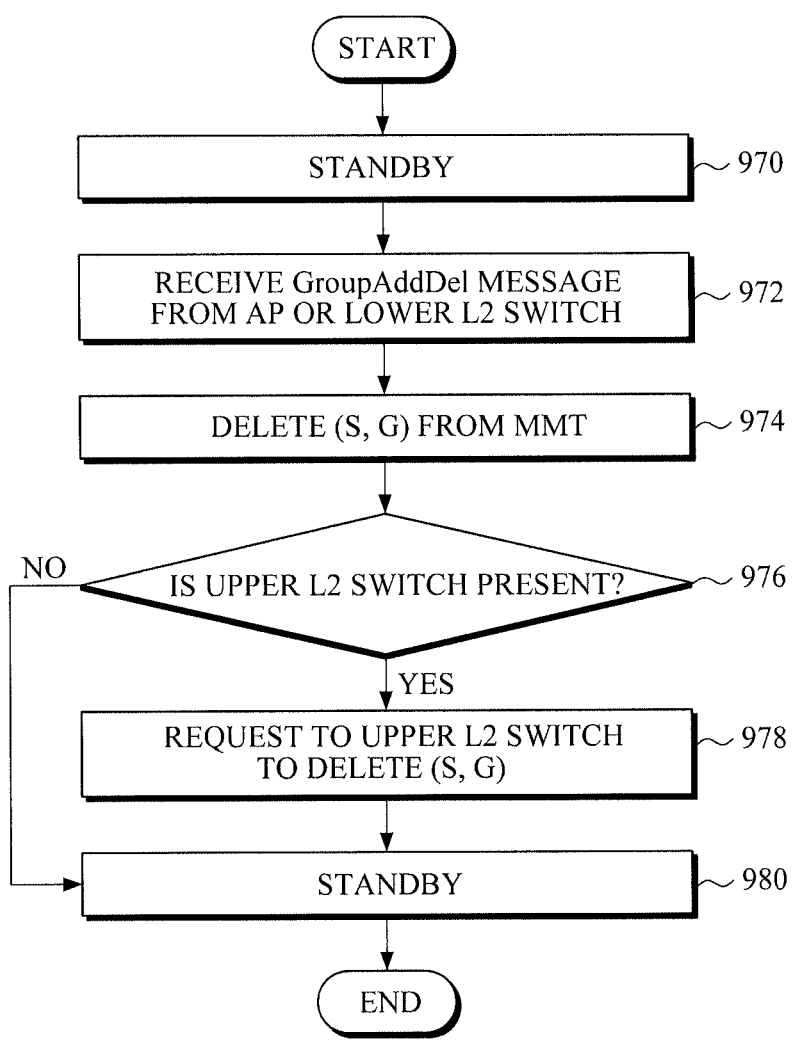

Referring to FIG. 9D, in message receiving standby mode (970), the MTHM 142a of the SW1 14a receives a GroupDelRequest message from a lower L2 switch, i.e., the SW2 14b or the AP 12, and searches the MMT to find MAC address information of a corresponding MN 10 to delete multicast service information (974). After deletion, it is determined whether an upper L2 switch is present (976), and if present, the MTHM 142a transmits a message (GroupDelRequest (MAC,S,G) message) to the upper L2 switch to request deleting the multicast service information of the MN 10 (978), and enters again message receiving standby mode (980).

As illustrated in the above examples, when a mobile node is handed over from one cell to another while being provided with a multicast service in a wireless mobile communication network, multicast traffic routing supports functions performed in layer 2 network equipment regardless of multicast group management protocol such as IGMP within a section formed by a wireless connection apparatus (AP) and an L2 switch, and thus multicast traffic can be fast and is seamlessly handed over. Accordingly, a viewer to be provided with the multicast service is able to use smooth, seamless multicast type multimedia through a mobile node while moving between cells.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An access point (AP) comprising:
   a handover manager configured to manage media access control (MAC) address information of a mobile node connected to a wireless communication network and multicast service source and group information in respect of a multicast service to be provided to the mobile node, and to support, in association with a layer 2 (L2) switch, consecutive multicast handover of the mobile node from one cell to another by providing pieces of the managed information to the L2 switch.

2. The access point of claim 1, further comprising:
   an Internet group management protocol (IGMP) snooping unit configured to snoop an IGMP message that is generated by the mobile node to be provided with a multicast service; and
   an L2 connection manager configured to detect a network connection attempt of the mobile node,
   wherein the handover manager receives IGMP snooping information from the IGMP snooping unit, and receives the MAC address information of the mobile node of the L2 connection manager.

3. The access point of claim 2, wherein the handover manager is further configured to extract the MAC address information of the mobile node in response to reception of a network connection attempt message of the mobile node from the L2 connection manager, to store the extracted MAC address information if the extracted MAC address information has not been registered, and to report the connection of the mobile node together with the stored MAC address information to the L2 switch.

4. The access point of claim 2, wherein the handover manager is further configured to extract multicast service source and group information from an IGPM join message which has been received from the IGMP snooping unit, to store the extracted multicast service source and group information and to request the L2 switch to add the multicast service and source information thereto.

5. The access point of claim 2, wherein the handover manager is further configured to extract multicast service source and group information from an IGMP leave message which has been received from the IGMP snooping unit, to delete the extracted multicast service source and group information from a previously stored mobile multicast table, and to request the L2 switch to delete multicast service source and group information.

6. The access point of claim 2, wherein the handover manager is further configured to add multicast service source and group information thereto in response to a request from the L2 switch, and to add multicast traffic to a connected mobile node.

7. A layer 2 (L2) switch comprising:
   a multicast handover manager configured to manage, in association with an access point or another L2 switch, media access control (MAC) address information of a mobile node connected to a wireless communication network and multicast service source group information and physical port information in respect of a multicast service to be provided to the mobile node in an effort to support consecutive multicast handover of the mobile node from one cell to another; and
   a routing manager configured to add multicast traffic to a physical port designated in response to a request from the multicast handover manager.

8. The L2 switch of claim 7, wherein the multicast handover manager is further configured to determine, in response to reception of a request from the access point or a lower L2 switch to add MAC address information of a mobile node thereto, whether the MAC address information has been registered, and if the MAC address information is not registered, register the MAC address information and report connection of a new mobile node along with the MAC address information to the L2 switch.

9. The L2 switch of claim 8, wherein the multicast handover manager is further configured to update, when it is determined that the MAC address information has been registered, physical port information of the MAC address information to information of a physical port to which the mobile node is being connected, and add multicast traffic to the updated physical port, and to transmit multicast service source and group information to the lower L2 switch or the access point.

10. The L2 switch of claim 7, wherein the multicast handover manager is further configured to add multicast service source and group information thereto in response to a request from the access point or a lower L2 switch, and to request an upper L2 switch to add multicast service source and group information thereto.

11. The L2 switch of claim 7, wherein the multicast handover manager is further configured to update multicast service source and group information in response to a request from an upper L2 switch, to request the routing manager to add multicast traffic to a physical port through which the multicast traffic is to be transmitted to the access point, and to instruct a lower L2 switch or the access point to add multicast service source and group information thereto.

12. The L2 switch of claim 7, wherein the multicast handover manager is further configured to delete the multicast service source and group information from a mobile multicast table in response to a request from the access point or a lower L2 switch, and to request an upper L2 switch to delete multicast service source and group information.

13. A method of an L2 switch for supporting multicast handover of a mobile node, the method comprising:
   acquiring MAC address information of the mobile node from an access point or a lower L2 switch;
   determining whether the acquired MAC address information has been registered; and
   if it is determined that the MAC address information has been registered, updating physical port information to information of a physical port to which the mobile node is being connected, and adding multicast traffic to the updated physical port.

14. The method of claim 13, further comprising:
   transmitting a message to the access point or a lower L2 switch through a control channel to indicate that the mobile node is being provided with a multicast service.

15. A method of an L2 switch for supporting multicast handover of a mobile node, the method comprising:
   acquiring MAC address information of the mobile node from an access point;
   storing the acquired MAC address information, and reporting connection of a new mobile node along with the stored MAC address information to an upper L2 switch; and
   updating multicast service information to multicast service source and group information of a multicast service which is provided through the upper L2 switch, and adding multicast traffic to a physical port through which multicast traffic is to be transmitted to the mobile node.

16. The method of claim 15, further comprising:
   transmitting a message to the access point through a control channel to indicate that the mobile node is being provided with a multicast service.

17. A method of an access point for supporting consecutive multicast handover of a mobile mode, the method comprising:
   acquiring MAC address information of the mobile node by detecting a network connection attempt of the mobile node;
   storing the acquired MAC address information and reporting connection of the mobile node along with the stored MAC address information to an L2 switch; and
   adding multicast service source and group information in response to a request from the L2 switch which confirms, based on the reporting result, that the mobile node is handed over to the access point and being provided with a multicast service, and transmitting multicast traffic to the mobile node.

* * * * *